United States Patent
Amico et al.

(10) Patent No.: US 12,429,145 B2
(45) Date of Patent: Sep. 30, 2025

(54) TUBULAR ELEMENT FOR ELECTROMAGNETIC VALVES AND RELATED ELECTROMAGNETIC VALVE

(71) Applicant: ELBI INTERNATIONAL S.P.A, Turin (IT)

(72) Inventors: Settimo Amico, Shandong (CN); Emanuele Barale, Cuneo (IT)

(73) Assignee: ELBI INTERNATIONAL S.P.A, Turin (IT)

( * ) Notice: Subject to any disclaimer, the term of this patent is extended or adjusted under 35 U.S.C. 154(b) by 3 days.

(21) Appl. No.: 18/699,260

(22) PCT Filed: Oct. 6, 2022

(86) PCT No.: PCT/IB2022/059532
§ 371 (c)(1),
(2) Date: Apr. 5, 2024

(87) PCT Pub. No.: WO2023/057938
PCT Pub. Date: Apr. 13, 2023

(65) Prior Publication Data
US 2024/0318740 A1    Sep. 26, 2024

(30) Foreign Application Priority Data
Oct. 7, 2021 (IT) .......................... 102021000025658

(51) Int. Cl.
*F16K 31/06* (2006.01)
(52) U.S. Cl.
CPC ...... *F16K 31/0672* (2013.01); *F16K 31/0675* (2013.01)

(58) Field of Classification Search
CPC .......................... F16K 31/0672; F16K 31/0675
See application file for complete search history.

(56) References Cited

U.S. PATENT DOCUMENTS

| 8,576,032 B2 * | 11/2013 | Herbert | F16K 37/0041 335/220 |
| 10,054,244 B2 * | 8/2018 | Querejeta Andueza | F16K 31/0675 |
| 10,544,876 B2 * | 1/2020 | Chen | F16K 31/0672 |

(Continued)

FOREIGN PATENT DOCUMENTS

GB          2044409 A       10/1980

OTHER PUBLICATIONS

International Search Report and Written Opinion for PCT/IB2022/059532 (Dec. 12, 2022).

(Continued)

*Primary Examiner* — Umashankar Venkatesan
(74) *Attorney, Agent, or Firm* — Merchant & Gould P.C.

(57) ABSTRACT

A tubular element for electromagnetic valves is adapted to be assembled to a valve body in an electromagnetic valve. The tubular element includes: a housing, adapted to internally receive a core and allow the core to slide therein for switching the electromagnetic valve, and a connection portion adapted to be removably fixed to the valve body for assembling the tubular element to the valve body. The housing has a body which is separate from and independent of the connection portion, which in turn has a body. The body of the housing is removably connectable to the body of the connection portion, forming an assembly.

9 Claims, 2 Drawing Sheets

(56) References Cited

U.S. PATENT DOCUMENTS

| | | | |
|---|---|---|---|
| 11,112,025 B2* | 9/2021 | Bartow | F16K 7/17 |
| 11,873,917 B2* | 1/2024 | Wang | F16K 31/404 |
| 12,007,038 B2* | 6/2024 | Wang | F16K 31/404 |
| 2024/0218936 A1* | 7/2024 | Zhang | F16K 31/402 |

OTHER PUBLICATIONS

International Preliminary Report on Patentability for PCT/IB2022/059532 (Jan. 23, 2024).

* cited by examiner

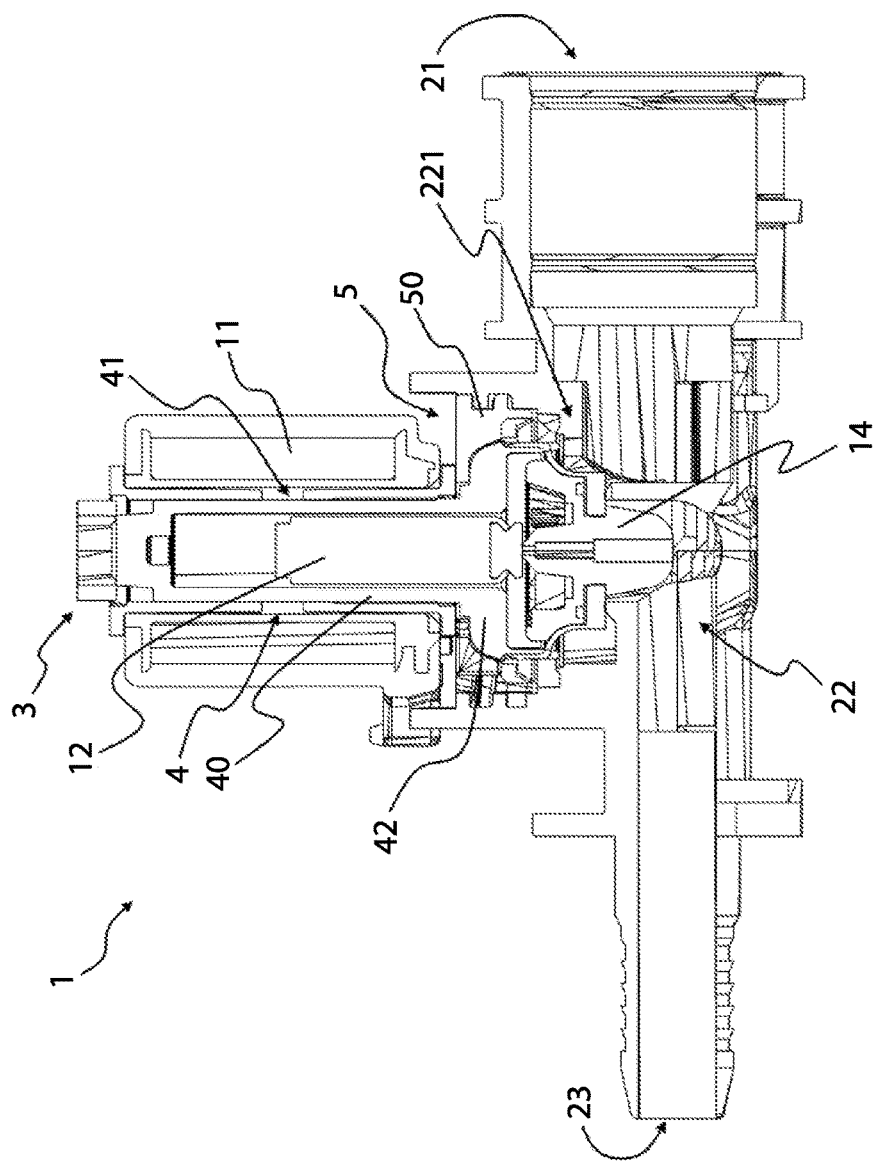
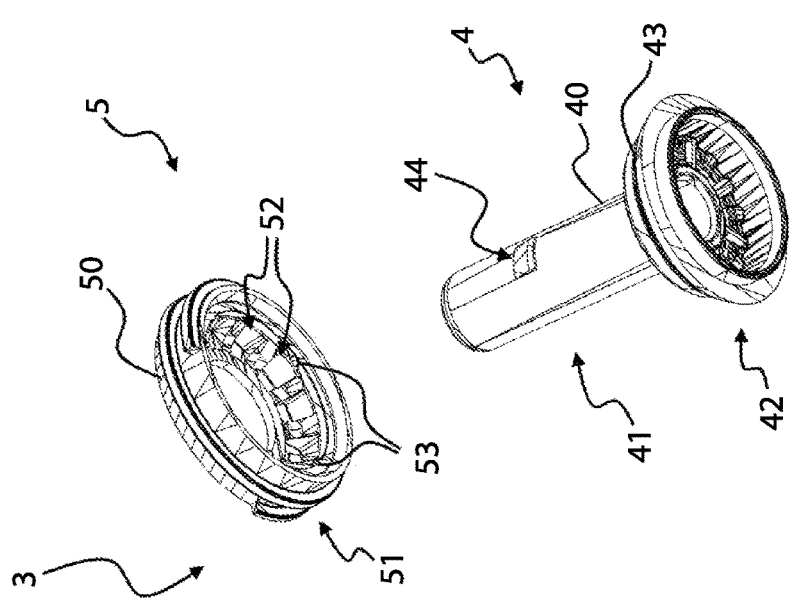
Fig. 3
Fig. 2

TUBULAR ELEMENT FOR ELECTROMAGNETIC VALVES AND RELATED ELECTROMAGNETIC VALVE

This application is a National Stage Application of International Application No. PCT/IB2022/059532, filed Oct. 6, 2022, which claims benefit of application No. 102021000025658, filed Oct. 7, 2021 in Italy and which applications are incorporated herein by reference. To the extent appropriate, a claim of priority is made to each of the above-disclosed applications.

The present invention relates to a tubular element for electromagnetic valves, which is adapted to be surrounded by a coil and to internally house a movable core.

The present invention further relates to an electromagnetic valve having a tubular element according to the present invention assembled to the valve body.

It is known that electromagnetic valves comprise a tubular element removably connected to the valve body. In particular, tubular elements are known which comprise: a housing, adapted to internally receive a core and allow it to slide therein; and a connection portion, adapted to be removably fixed to the valve body.

In the current state of the art, said tubular element is made as one monolithic piece, in which both said housing and said connection portion are formed.

It is also known that there is a tendency in the industry to reduce the costs and the number of parts that have to be assembled when manufacturing components for electromagnetic valves. Therefore, there is currently in the art a bias against manufacturing components that are normally made as one monolithic body as multiple parts to be then assembled together, since there is an increasing demand for reducing production and assembly costs.

The current state of the art does not consider the possibility of recovering parts of the electrovalve in a simple and quick manner, should it turn out to be unsuitable for use.

It must also be pointed out that the fixing of the tubular element to the valve body may vary from case to case as needed; for example, it may be achieved by interlocking or by means of a bayonet and/or threaded connection.

The fixing of the tubular element to the valve body must be such as to ensure hydraulic tightness while at the same time not affecting the proper operation of the valve element. In fact, in electromagnetic valves comprising a diaphragm element, which interacts, even only partially, with said tubular element, the movements for sealingly fasten such tubular element to the valve body should not jeopardize the proper operation of such diaphragm element. A technical problem known in the prior art relates to the need for preventing such diaphragm element from becoming deformed, e.g. twisted, when said tubular element is fastened to the valve body. This problem is particularly felt in implementations wherein said tubular element is screwed onto the valve body.

There is also an increasing demand for facilitating the assembly of the tubular element, ensuring that the core can position itself correctly while preventing it from jamming or sticking.

Patent GB2044409A discloses an electrically operated valve for clothes washing and dish washing machines which comprises a body provided with water intake and discharge connections and a seat for a diaphragm closure member, and a solenoid capable of controlling the closure member by means of a movable system, the closure member being mounted on a hollow member in a single functional unit which encloses the movable system, said functional unit being fixed to the body of the valve by means of a ring which is screwed in an internal threaded portion of the body to clamp the peripheries of the member and of the diaphragm against the valve body.

In general, the present invention aims at solving these and other technical problems by providing a tubular element in which the housing and the connection portion have two distinct bodies that can be removably connected to each other to form an assembly.

One aspect of the present invention relates to a tubular element for electromagnetic valves.

A further aspect of the present invention relates to an electromagnetic valve.

The features and advantages of the tubular element and electrovalve will become clear and apparent in light of the following description of several possible embodiments of the tubular element and electrovalve, provided herein by way of non-limiting example, as well as from the annexed drawings, wherein:

FIG. 1A shows an exploded view of the tubular element, while FIG. 1B shows a perspective view of the tubular element assembled into an assembly;

FIG. 2 shows an exploded view of a second possible embodiment of the tubular element according to the present invention;

FIG. 3 shows a sectional view relative to a vertical plane of one possible embodiment of an electromagnetic valve according to the present invention, comprising a tubular element according to the present invention.

Figure 1B:
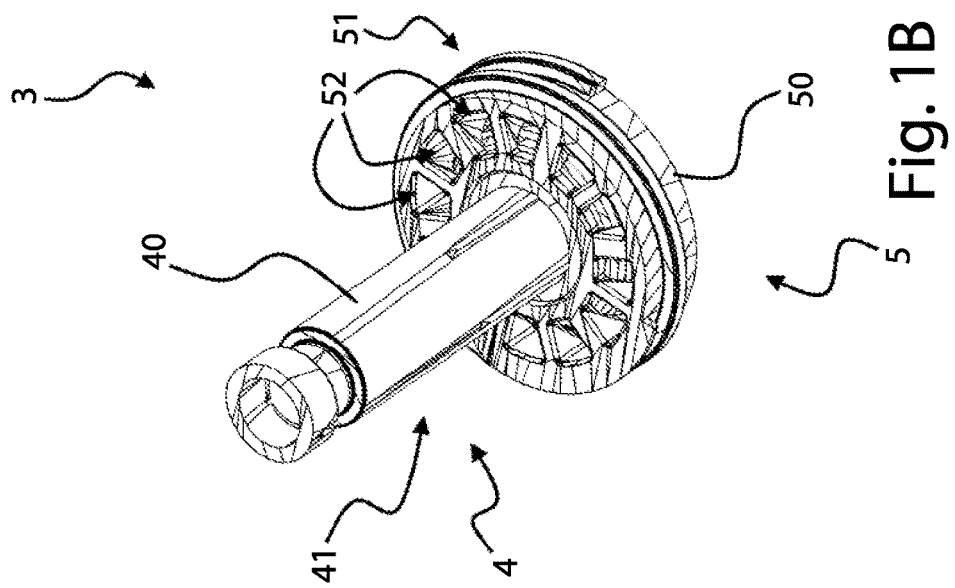
FIGS. 1A and 1B show one possible embodiment of the tubular element according to the present invention; in particular.

With reference to the above-listed figures, reference numeral 3 designates as a whole a tubular element for electromagnetic valves according to the present invention, whereas reference numeral 1 designates as a whole an electromagnetic valve according to the present invention.

Tubular element 3 is particularly suitable for application to electromagnetic valves 1. In particular, said tubular element 3 is adapted to be assembled to a valve body 2 comprised in an electromagnetic valve 1.

Tubular element 3 according to the present invention comprises: a housing 4, adapted to internally receive a core 12 and allow it to slide therein for switching said electromagnetic valve 1; and a connection portion 5, which is adapted to be removably fixed to said valve body 2 for assembling tubular element 3 to said valve body 2.

In the preferred embodiment of tubular element 3 according to the present invention, said housing 4 has a body 40 which is separate from and independent of said connection portion 5, the latter having in turn a body 50 of its own, in particular separate from and independent of said body 40 of tubular element 4.

Said body 40 of said housing 4 is connectable, in a removable manner, to said body 50 of connection portion 5, thereby forming an assembly.

The present solution makes it possible to obtain said tubular element 3 from two bodies that can be removably connected to each other.

Moreover, the present invention permits recovering at least one of the two bodies of the tubular element in case said tubular element 3 and/or electromagnetic valve 1 is not fully compliant with the specifications and must therefore be discarded. The present solution makes it possible to reuse at least one body (40, 50) in another assembly of said tubular element 3 to be assembled to another valve body 2.

In addition, said housing 4 and said connection portion 5 are not merely two independent elements, but are advantageously adapted to interact with each other, becoming an assembly even when tubular element 3 is a separate part not yet assembled to valve body 2.

In a preferred, but merely illustrative and non-limiting embodiment of tubular element 3 according to the present invention, said body 50 of connection portion 5 has an annular structure. Such an embodiment allows placing said body 50 of connection portion 5 around body 40 of housing 4; for instance, body 40 of housing 4 can be suitably inserted into the hole defined by annular body 50 of connection portion 5, e.g. by making a movement along the axis that defines the longitudinal extension of said housing 4.

In a preferred embodiment of said connection portion 5, and in particular of body 50, it is adapted to be fastened to valve body 2 by means of an at least partly rotational movement. In such an embodiment, said body 50 of connection portion 5 has an annular structure.

More generally, the connection of connection portion 5 to pvalve body 2 by means of an at least partly rotational movement can be achieved by means of a bayonet connection or by means of threaded portions or other connection systems comprising at least one at least partly rotational movement.

In a preferred embodiment of tubular element 3 according to the present invention, the removable connection between said body 40 of housing 4 and body 50 of connection portion 5 is such that the movements imparted to connection portion 5 will not jeopardize the proper operation of one or more diaphragm elements 14 comprised in valve body 2.

In an even more preferable embodiment, the removable connection between said body 40 of housing 4 and body 50 of connection portion 5 is such that at least the rotational component of a movement of said body 50 of connection portion 5, for removably fixing tubular element 3 to valve body 2, is not transmitted to body 40 of said housing 4. The present embodiment makes it possible to prevent that, in electromagnetic valves 1 comprising a diaphragm element 14 interacting, at least partly, with said tubular element 3, and in particular with said housing 4, e.g. with said body 40 of housing 4, such diaphragm element 14 might be adversely affected, e.g. twisted, by the rotational component of the movement made by said connection portion 5.

In a preferred embodiment of tubular element 3 according to the present invention, said body 50 of connection portion 5 comprises a threaded portion 51. Said threaded portion 51 is located on the outer edge of the annular structure of said body 50. In such an embodiment, connection portion 5 permits fastening tubular element 3 onto valve body 2 by screwing said connection portion 5. In particular, in the preferred embodiment the rotational movement of said body 50 of connection portion 5 for threadedly fixing tubular element 3 to valve body 2 is not transmitted to body 40 of said housing 4. The present embodiment prevents such rotational movement from being transferred to a diaphragm element 14 comprised in a valve body 2 of an electromagnetic valve 1. It has been observed, in fact, that such rotational movements imparted to a diaphragm element 14 may twist, even only partly, such diaphragm element 14, thereby impairing its sealing function. This problem is particularly important in indirect electromagnetic valves 1, wherein said diaphragm element is particularly sensitive and, should it undergo any distortion, may no longer ensure a proper sealing in case of low pressure of the liquid flow entering electrovalve 1.

Describing now more in detail the construction of one possible, but merely illustrative and non-limiting embodiment of tubular element 3 according to the present invention, body 40 of housing 4 comprises a cylindrical portion 41 and a sealing portion 42.

Said cylindrical portion 41 has a distal end, preferably closed, and an open proximal end.

The distal end of cylindrical portion 41 is that end which is farthest from valve body 2 and from connection portion 5 when tubular element 3 is assembled to valve body 2; conversely, the proximal end of cylindrical portion 41 is that end which is closest to valve body 2 and to connection portion 5 when tubular element 3 is assembled to valve body 2.

Preferably, said sealing portion 42 is adapted to act, at least partly, upon a diaphragm element 14 comprised in electromagnetic valve 1.

In a preferred, but merely illustrative and non-limiting embodiment in which said electromagnetic valve 1 is an indirect valve, said diaphragm element 14 is adapted to be arranged in a seat defined by said sealing portion 42, in connection with said sealing portion 42. In such an embodiment, said sealing portion 42 advantageously has a circular profile defining a dome-shaped structure that joins said cylindrical portion 41 of housing 4. This embodiment facilitates assembling tubular element 3 and diaphragm element 14 to valve body 2.

In the embodiment in which said electromagnetic valve 1 is a direct valve, said sealing portion 42 is adapted to define at least one stopper element, in the form of a shutter, for diaphragm element 14.

More generally, said sealing portion 42 is located at the open proximal end of cylindrical portion 41.

Preferably, said sealing portion 42 has a tapered shape, e.g. a dome-like shape, for connecting said cylindrical portion 41 to said connection portion 5, thereby providing a removable connection between said connection portion 5 and said housing 4.

In a preferred embodiment, said sealing portion 42 comprises connection means 43. Said connection means 43 are adapted to removably connect said body 40 of housing 4 to body 50 of connection portion 5.

Such connection means 43 make it possible to removably connect said body 50 of connection portion 5 to said body 40 of housing 4, thereby obtaining an assembly, while at the same time preventing the rotational component of the movements of said body 50 of connection portion 5 from being transmitted to body 40 of said housing 4.

In such an embodiment of tubular element 3 according to the present invention, said body 50 of connection portion 5 has an annular structure; in particular, said body 50 defines the edges of a central through hole.

In a preferred embodiment, connection elements 53 are comprised on at least a portion of the inner edge of said annular structure of body 50, which are preferably arranged along a circumference.

Said connection elements 53 are adapted to cooperate with said connection means 43 of housing 4 to obtain the removable connection. This embodiment allows preventing the rotational components of the motion of body 50 of connection portion 5 for removably fixing tubular element 3 to valve body 2 from being transmitted to body 40 of said housing 4.

In a preferred embodiment, the combination of connection elements 53 and connection means 43 provides a constraint preventing any mutual movements of housing 4 and connection portion 5 along a longitudinal axis of tubular element 3 while however allowing housing 4 and connection portion 5 to freely rotate relative to each other about the same longitudinal axis of tubular element 3.

In one possible embodiment, said connection means 43 consist of an undercut formed on the outer surface of said sealing portion 42, e.g. defining an annular guide. In the same embodiment, said connection means 53 are a plurality of protrusions formed in a portion of the inner edge of the annular structure of body 50 of connection portion 5, preferably arranged along a circumference. The present embodiment facilitates assembling together body 40 of housing 4 and body 50 of connection portion 5 and separating such two bodies in case of need. Furthermore, the present embodiment allows body 50 of connection portion 5 to rotate relative to body 40 of housing 4, thereby preventing a rotational motion imparted to body 50 of connection portion 5 from being transmitted to body 40 of rhousing 4.

Describing now in more detail the construction of a preferred, though merely illustrative and non-limiting embodiment of tubular element 3 according to the present invention, the annular structure of body 50 of connection portion 5 defines gripping elements 52. Said gripping elements 52 are adapted to allow imparting the at least partly rotational movement to connection portion 5 for removably fixing tubular element 3 to valve body 2.

Preferably, said gripping elements 52 make it possible to screw said connection portion 5 onto valve body 2 in order to assemble tubular element 3 to said valve body 2.

Describing now a preferred embodiment in more detail, said gripping elements 52 are slots formed in annular body 50 of connection portion 5, in particular arranged radially, which facilitate the exertion, e.g. by means of a tool, of a force on said gripping elements 52 to impart a rotational movement to said connection portion 5.

In the present embodiment, aiming at reducing the weight and the amount of material needed for producing connection portion 5, said gripping elements 52 are through slots.

Preferably, said gripping elements 52 are arranged in a portion of body 50 of connection portion 5 where they cannot interfere with said connection elements 53 and where they cannot hinder the removable connection between said body 40 of said housing 4 and said body 50 of connection portion 5; for example, they are arranged in a higher position along the longitudinal extension of said tubular element 3.

More generally, housing 4 of tubular element 3 according to the present invention comprises a locking system 44. Said locking system 44 is adapted to lock a coil 11, comprised in electromagnetic valve 1, around cylindrical portion 41 of housing 4.

Said locking system 44 is adapted to assume at least two distinct configurations, i.e. a first configuration, in which it allows said coil 11 to be positioned around and/or removed from said at least a portion of housing 4; and a second configuration, different from said first configuration, in which it locks said coil 11 around said at least a portion of housing 4, in particular around said cylindrical portion 41.

In one possible embodiment, said locking system 44 is either reversible, i.e. it allows switching from one configuration to the other, or non-reversible, i.e. said locking system 44 is designed to prevent, once said second configuration has been assumed, returning to said first configuration.

In one possible embodiment of tubular element 3 according to the present invention, a locking system 44 is integrated at the distal end of cylindrical portion 41 of body 40 of housing 4. Said locking system 44 is adapted to lock coil 11, comprised in electromagnetic valve 1, around cylindrical portion 41 of housing 4.

Preferably, said locking system 44 has, in said first configuration, an outside diameter of a known value, allowing said coil 11 to be positioned around and/or removed from cylindrical portion 41; whereas in said second configuration the outside diameter of said locking system 44 is greater than said known value, thus locking said coil 11 around cylindrical portion 41 of housing 4. In a preferred embodiment, said locking system 44 is adapted to remain in said first configuration until it is brought into said second configuration, e.g. through the application of an external force. Preferably, said locking system 44 can no longer, once it has assumed said second configuration, be returned into said first configuration without irreversibly damaging the structure and impairing the operation of locking system 44 itself.

Alternatively, said locking system 44 is located in a central portion of cylindrical portion 41 of body 4, with reference to the longitudinal axis of tubular element 3. Moreover, said locking system 44 may consist of one or more protrusions protruding from the outer surface of cylindrical portion 41.

In another alternative embodiment, said locking system 44 comprises flexible elements arranged at the distal end of cylindrical portion 41 of body 40 of housing 4, which are adapted to become deformed and lock said coil 11 around cylindrical portion 41 of housing 4 when said coil 11 is first fitted around pcylindrical portion 41.

More generally, said locking system 44 may be made as one piece with said cylindrical portion 41, e.g. said locking system 44 and said housing 4 being a monolithic body. As an alternative, said locking system 44 is a separate element that can be removably assembled to cylindrical portion 41 of housing 4.

Figure 1A:
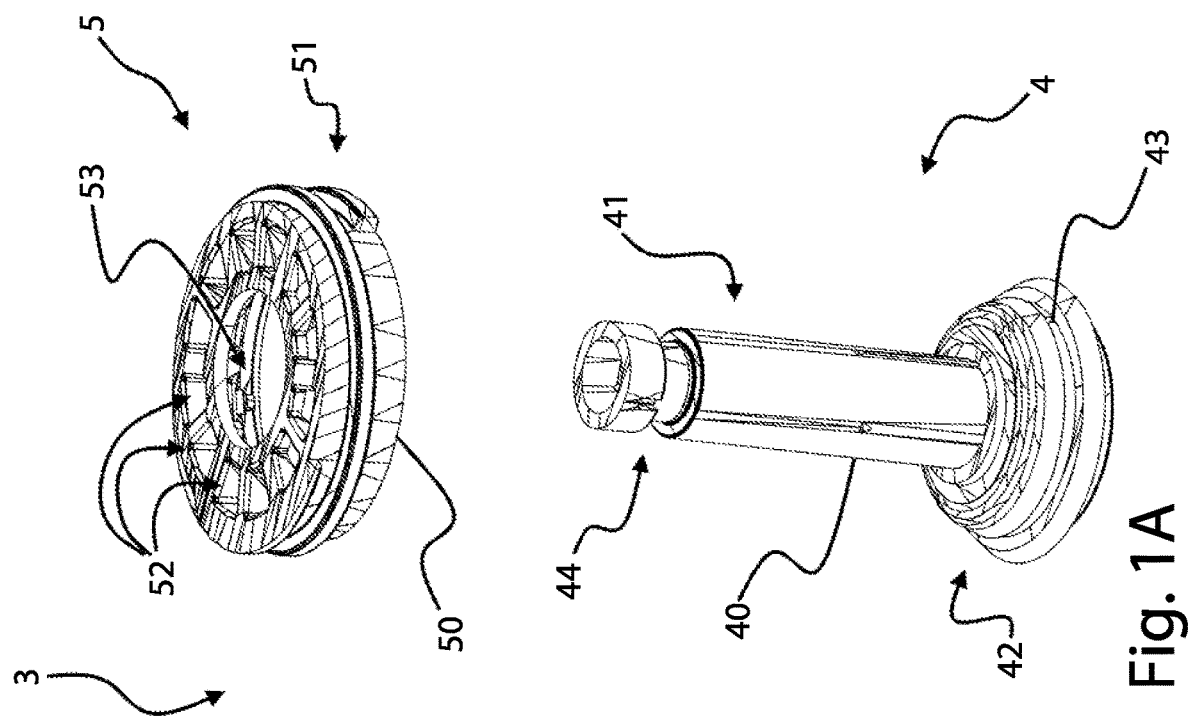

FIG. 1A shows an exploded view of a first possible embodiment of tubular element 3 according to the present invention. In this figure, one can see that connection portion 5 has a body 50 which is distinct and separate from body 40 of housing 4. Also, FIG. 1 shows the annular shape of body 50 of connection portion 5, on the outer edge of which there is a threaded portion 51.

Said annular body 50 also defines a plurality of gripping elements 52, in the form of through slots arranged radially.

On the inner edge of body 50 there are connection elements 53 adapted to cooperate with said connection means 43 of housing 4 to obtain a removable connection. Said connection means 43 are provided on the outer edge of the sealing portion 42 in the form of a circular groove or guide, in which said connection elements 53 of connection portion 5 can perform their function.

On top of sealing portion 42 there is said cylindrical portion 41, defining said monolithic body 40 of housing 4.

At the distal end of cylindrical portion 41 one possible embodiment of locking system 44 is comprised, which is integrated into body 40 of housing 4.

FIG. 1B shows a perspective view of tubular element 3 of FIG. 1A in the assembled condition. In this figure one can see that housing 4 has been inserted into the hole defined by annular body 50 of connection portion 5, thus forming an assembly. The figure also shows further construction details of both body 40 of housing 4, particularly cylindrical portion 41, and body 50 of connection portion 5. In particular, the drawing shows in more detail the shape of the slots that define said gripping elements 52 and the shape of threaded portion 51.

FIG. 2 shows an exploded view of a second possible embodiment of tubular element 3 according to the present invention. In this figure one can see that connection portion 5 has a body 50 which is distinct and separate from body 40 of housing 4. In particular, said connection portion 5 has an annular body 50, on the outer edge of which there is a threaded portion 51.

Said annular body 50 also defines a plurality of gripping elements 52, in the form of through slots arranged radially, and a plurality of connection elements 53 located on the inner edge of body 50.

This figure also shows a housing 4 comprising a sealing portion 42, on the outer surface of which an undercut guide is formed, which defines said connection means 43 that cooperate with said connection elements 53 of body 50 of connection portion 5 to provide the removable connection.

On top of sealing portion 42 there is said cylindrical portion 41, defining said monolithic body 40 of housing 4.

In a central portion of cylindrical portion 41, one possible embodiment of locking system 44 is comprised. In this embodiment, locking system 44 is integrated into body 40 of housing 4. In the present embodiment, said locking system 44 is at least one protrusion adapted to interact with a housing provided in said coil 11 to allow locking said coil 11 around said housing 4.

Tubular element 3 according to the present invention is particularly suitable for being assembled to an electromagnetic valve 1.

More generally, tubular element 3 is particularly suitable for being included in an electromagnetic device, preferably comprised in a household appliance, e.g. washing machines, dishwashers, refrigerators, ovens, etc., or in components and/or devices adapted for use in such household appliances, in accordance with the present invention. Said electromagnetic device is, for example, a pump, a switching valve, etc.

In the following part of the present description, reference will be made to an electromagnetic valve 1, but the concepts and/or components comprised and described therein may also be applicable, wherever appropriate, to a generic electromagnetic device.

Said electromagnetic valve 1 is in turn particularly suitable for use in household appliances such as, for example, washing machines, dishwashers, ovens, etc., or in components and/or devices adapted for use in such household appliances.

In general, said electromagnetic valve 1 comprises a valve body 2. Said valve body 2 comprises in turn at least one inlet 21, e.g. only one or two or more, which is adapted to be connected to a supply duct, e.g. the water mains; at least one outlet 23, e.g. only one or two or more, adapted to be connected to a duct of a downstream circuit, and at least one connection tract 22 adapted to hydraulically connect said at least one inlet 21 to said at least one outlet 23.

Said valve body 2 may be the structure of an individual electromagnetic valve 1, or may be incorporated into another device or in a circuit, e.g. a water softener, a regeneration circuit, etc.

Said electromagnetic valve 1 further comprises at least one diaphragm element 14, arranged in a seat 221 formed in said connection tract 22. Said diaphragm element 14 is adapted to selectively allow a flow of fluid between said at least one inlet 21 and said at least one outlet 23 of valve body 2.

Said electromagnetic valve 1 further comprises a tubular element 3 according to the present invention, adapted to be removably connected to said valve body 2 while ensuring hydraulic tightness, e.g. in cooperation with said diaphragm element 14.

Said electromagnetic valve 1 further comprises a core 12, made of ferromagnetic material or composite material or any other material suitable to interact with electromagnetic fields generated by said coil 11. Said core 12 is adapted to slide within tubular element 3 and cooperate with said diaphragm element 14, whether directly or indirectly, in order to selectively allow a flow of fluid between said at least one inlet 21 and said at least one outlet 23 of valve body 2.

As aforementioned, said electromagnetic valve 1 comprises a coil 11. Said coil 11 is arranged around said tubular element 3, in particular around said cylindrical portion 41. Said coil 11 is adapted to generate a magnetic field capable of selectively moving said core 12.

Within tubular element 3 an elastic element, e.g. a spring, preferably a coil spring, may be advantageously positioned, which is adapted to allow said core 12 to return into a predetermined position following the action of the magnetic field generated by said coil 11.

In a preferred, but merely illustrative and non-limiting, embodiment of electromagnetic valve 1 according to the present invention, said tubular element 3 according to the present invention is adapted to be screwed onto said valve body 2.

In other alternative embodiments, said tubular element 3 according to the present invention is adapted to be assembled to said valve body 2 by means of a bayonet connection or an interlocking connection.

In one possible embodiment, said electromagnetic valve 1 according to the present invention is an indirect valve.

FIG. 3 shows, in a sectional view relative to a vertical plane, one possible embodiment of an electromagnetic valve 1 according to the present invention, comprising a tubular element 3 according to the present invention.

The drawing shows a valve body 2 having at least one inlet 21, at least one outlet 23, and a connection tract 22, the latter hydraulically connecting said at least one inlet 21 to said at least one outlet 23.

Said connection tract 22 comprises a seat 221, e.g. formed in its structure, in which a diaphragm element 14 is arranged. In the illustrated embodiment, said diaphragm element 14 is such as to realize an indirect valve adapted to selectively allow a flow of fluid between said at least one inlet 21 and said at least one outlet 23 of valve body 2.

Said tubular element 3 according to the present invention is placed on top of said diaphragm element 14. Said tubular element 3 is removably connected, in particular screwed, to said valve body 2, thus ensuring hydraulic tightness, in particular in cooperation with said diaphragm element 14.

In the illustrated embodiment, said tubular element 3 comprises a housing 4 and a connection portion 5. Said housing 4 has a body 40 which is distinct from and independent of body 50 of connection portion 5.

Said connection portion 5 is removably fixed to valve body 2 when assembling tubular element 3 to said valve body 2.

In the illustrated embodiment, body 40 of the housing 4 comprises: a cylindrical portion 41 having a closed distal end and an open proximal end; and a sealing portion 42, which acts upon diaphragm element 14.

Said housing 4 internally houses a core 12, which is adapted to slide within said cylindrical portion 41. Said core 12 cooperates with said diaphragm element 14 to selectively allow a flow of fluid between inlet 21 and outlet 23 of valve body 2.

In the illustrated embodiment, a coil 11 is arranged around said tubular element 3, in particular around said cylindrical portion of housing 4, which coil 11 can generate a magnetic field capable of selectively moving said core 12.

In another possible embodiment, said electromagnetic valve 1 according to the present invention is a direct valve.

The features and the principle of operation of a direct valve and an indirect valve will not be described any further herein, since they are per se known to a person skilled in the art.

Even more generally, said electromagnetic valve 2 may be either a normally open valve or a normally closed valve, whose features and principles of operation are per se known to those skilled in the art.

One possible, though merely illustrative and non-limiting method of assembling an electromagnetic valve 1 according to the present invention comprises the following sequence of (successive) steps:

- providing the elements of an electromagnetic valve 1 according to the present invention;
- positioning core 12 in cylindrical portion 41 of body 40 of housing 4;
- associating diaphragm element 14 with sealing portion 42 of body 40 of housing 4;
- positioning the assembly including diaphragm element 14, core 12 and cylindrical portion 41 of body 40 of housing 4 into a seat 221 of valve body 2;
- assembling connection portion 5 with housing 4 of tubular element 3;
- tightening said connection portion 5 onto valve body 2 to ensure hydraulic tightness.

This implementation of the method avoids, when assembling tubular element 3 to valve body 2 on said diaphragm element 14, the exertion of any forces, e.g. twisting forces, that might impair the sealing function. This aspect is particularly advantageous for indirect electromagnetic valves 2.

Advantageously, the step of positioning core 12 may comprise a sub-step of positioning an elastic element, e.g. a spring. In such an implementation of the method of assembly, the assembly to be positioned into seat 221 of valve body 2 comprises also said spring, preferably a coil spring.

During the step of tightening said connection portion 5, said housing 4 may be advantageously held firm to prevent any rotational motion from being also transmitted to said housing 4.

According to the present invention, housing 4 performs the function of holding said diaphragm element 14 in position, while said connection portion 5 performs the function of securing tubular element 3 to valve body 2, without such two functions being mutually impaired when assembling said tubular element 3.

More generally, tubular element 3 according to the present invention can be easily used, e.g. as a spare part, and assembled to existing electrovalves 1 as an alternative to prior-art tubular elements 3.

The present invention also ensures, particularly for indirect electromagnetic valves 1, proper operation also at low pressures, thus improving the reliability of electromagnetic valve 1 because it prevents diaphragm element 14 from being subjected to stress conditions that might jeopardize the operability of such diaphragm element 14, particularly at low pressures. In particular, the present invention ensures tightness of electromagnetic valve 1 even when the pressure of the intake water is as low as 0.1 bar.

Any alternative embodiments of tubular element 3 and/or of the electromagnetic valve 1 which have not been described in detail herein, but which will be apparent to a person skilled in the art in light of the contents of the present patent application, shall be considered to fall within the protection scope of the present invention.

REFERENCE NUMERALS

Electromagnetic valve 1
Coil 11
Core 12
Diaphragm element 14
Valve body 2
Inlet 21
Connection tract 22
Seat 221
Outlet 23
Tubular element 3
Housing 4
Body 40
Cylindrical portion 41
Sealing portion 42
Connection means 43
Locking system 44
Connection portion 5
Body 50
Threaded portion 51
Gripping elements 52
Connection elements 53

The invention claimed is:

1. A tubular element for electromagnetic valves, adapted to be assembled to a valve body in an electromagnetic valve, comprising:
   a housing, adapted to internally receive a core and allow the core to slide therein for switching said electromagnetic valve;
   a connection portion adapted to be removably fixed to said valve body for assembling the tubular element to said valve body;
   wherein:
   said housing has a body which is separate from and independent of said connection portion, said connection portion having a connection portion body;
   said body of the housing comprising:
   a cylindrical portion having a closed distal end and an open proximal end;
   a sealing portion adapted to act upon a diaphragm element in the electromagnetic valve;
   said sealing portion being located at the open proximal end of the cylindrical portion;
   said connection portion body has an annular structure;
   said body of said housing and said connection portion body, are adapted to be removably connected to each other;
   wherein:
      said sealing portion comprises a connector adapted to removably connect said body of the housing to the connection portion body;
      said connection portion body comprises connection elements on an inner edge of said annular structure, said connection elements being adapted to cooperate with said connector of the housing, interacting with each other, to produce a removable connection and form an assembly.

2. The tubular element according to claim 1, wherein said connection portion body has an annular structure, and being adapted to be fixed to the valve body by an at least partially rotational movement;
   wherein the removable connection between said body of the housing and the connection portion body is configured so that at least a rotational component of a movement of said connection portion body, for removably connecting the tubular element to the valve body, is not transmitted to the body of said housing.

3. The tubular element according to claim 2, said connection portion body comprising a threaded portion on an outer edge of the annular structure of the connection portion body.

4. The tubular element according to claim 2, wherein the annular structure of the connection portion body defines gripping elements adapted to allow imparting the at least partially rotational movement to the connection portion for removably fixing the tubular element to the valve body.

5. The tubular element according to claim 1, wherein a locking system being integrated at the distal end of the cylindrical portion, and wherein said locking system is adapted to lock a coil in the electromagnetic valve around the cylindrical portion of the housing.

6. An electromagnetic valve for household appliances, comprising:
   a valve body comprising: at least one inlet, at least one outlet, and at least one connection tract adapted to hydraulically connect said at least one inlet to said at least one outlet;
   at least one diaphragm element, arranged in a seat formed in said at least one connection tract, adapted to selectively allow flow of fluid between said at least one inlet and said at least one outlet of the valve body;
   a tubular element adapted to be removably connected to said valve body while ensuring hydraulic tightness in cooperation with said diaphragm element;
   a core adapted to slide within the tubular element, cooperating with said diaphragm element to selectively allow flow of fluid between said at least one inlet and said at least one outlet of the valve body;
   a coil, arranged around said tubular element, adapted to generate a magnetic field adapted for selectively moving said core;
   wherein tubular element is the tubular element according to claim 1.

7. The electromagnetic valve according to claim 6, wherein said tubular element is screwed onto said valve body.

8. The electromagnetic valve according to claim 6, wherein said electromagnetic valve is an indirect valve.

9. The electromagnetic valve according to claim 6, wherein said electromagnetic valve is a direct valve.

* * * * *